Figure 1:
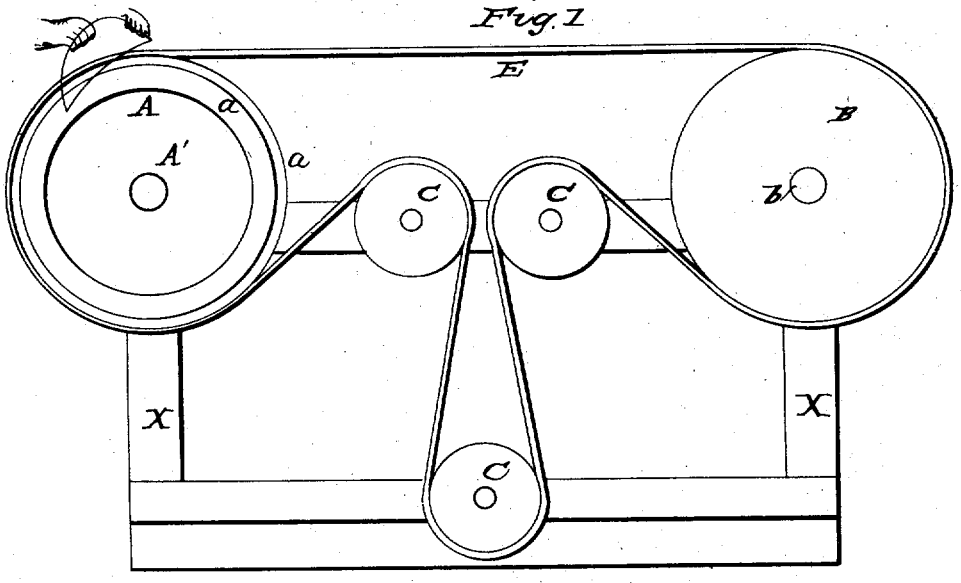

P. F. RANDOLPH.

Polishing Machine.

No. 4,127, Reissued Sept. 20, 1870.

Witnesses
Chas. F. Brown
Fred Thomas.

Inventor
P. F. Randolph
by H. W. Beadle
Atty.

N. PETERS. Photo-Lithographer, Washington, D. C.

United States Patent Office.

PETER F. RANDOLPH, OF JERSEYVILLE, ILLINOIS.

*Letters Patent No.* 95,265, *dated September* 28, 1869; *reissue No.* 4,127, *dated September* 20, 1870.

IMPROVEMENT IN POLISHING-MACHINES.

The Schedule referred to in these Letters Patent and making part of the same.

*To all whom it may concern:*

Be it known that I, PETER F. RANDOLPH, of Jerseyville, in the county of Jersey and State of Illinois, have invented a new and improved Polishing-Machine; and I do hereby declare that the following is a full and exact description of the same, reference being had to the accompanying drawing and to the letters of reference marked thereon.

This invention consists, mainly, in the combination of an endless belt, having a suitable polishing-surface, with a wheel or drum having an elastic face or tire.

It further consists, also, in certain details of construction.

In the drawing—

Figure 2:
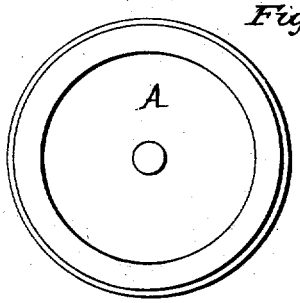

Figure 1 is a side elevation of my invention;

Figure 2, a side elevation of the wheel A; and

Figure 3:
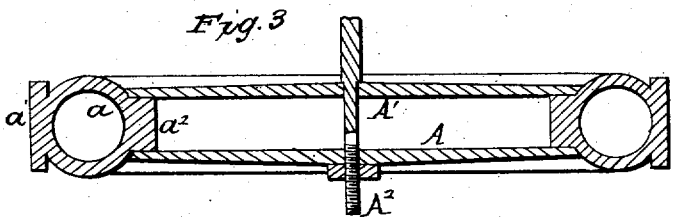

Figure 3, a vertical central section through the line *x x*, fig. 3.

To enable others skilled in the art to make and use my invention, I will now proceed to describe fully its construction and manner of operation.

X represents the foundation of the machine, which may be of any desired form, on which are located, in suitable bearings, the driving-wheel B, pulleys C, and grinding and polishing-wheel A, which latter consists of the circular clamps $A^1$ $A^1$, which are confined by the bolt $A^2$, and the elastic tube *a*, which is constructed of rubber or other suitable material, and is inflated and air-tight.

$a^1$ represents a flat rim, of similar material, and extending around the same.

The rim $a^1$ may be merely a protuberance on the tube *a*, or attached after the manner of an elastic tire. Its object is to furnish a bearing-surface for the belt E.

The tube *a* is provided on its inner circumference with the projection $a^2$, which is held between the clamps $A^1$, and confines the hollow rim *a* firmly in place.

The belt E is composed of duck or leather covered with emery, and passes over the wheel A, driving-wheel B and pulleys C, which latter, by their arrangement, admit of a much greater length of belting than could otherwise be obtained without extending the same beyond the limits of the machine.

I do not limit myself to the precise construction of wheel shown, as its form must necessarily be modified to suit the requirements of the work for which the wheel is used.

The operation of my invention will be readily understood.

The surface to be ground or polished is pressed against the belt, over the elastic rim *a* of the wheel A, which, by reason of its yielding nature, admits of all parts of the surface coming in contact with the belt. It is, therefore, peculiarly adapted to grinding plowshares and other irregular surfaces.

I am aware that an inflated rim of India rubber, coated with sand, has been employed, but I am not aware that a flexible wheel has been used in combination with an endless belt.

Having thus fully described my invention,

What I claim as new, and desire to secure by Letters Patent, is—

1. The combination of a wheel or drum, having an elastic face or tire, with an endless belt, provided with a polishing-surface, when the polishing-belt is arranged to run over the elastic wheel or drum, as described.

2. The wheel A, consisting of the inflated tube *a*, rim $a^1$, projection $a^2$, and clamps $A^1$, in combination with the belt E, driving-wheel B, and pulleys C, arranged and operated substantially as described.

This specification signed and witnessed this 29th day of August, 1870.

P. F. RANDOLPH.

Witnesses:

J. E. McCLURE,

JOHN J. BALLARD.